Patented Aug. 15, 1933

1,922,473

UNITED STATES PATENT OFFICE 1,922,473

METHOD OF PRODUCING PLASTIC MASSES, PETRIFYING AFTER THE SETTING

Hans Rudolph Schmedes de La Roche, Bremen, Germany

No Drawing. Application January 30, 1931, Serial No. 512,508, and in Germany June 26, 1930

4 Claims. (Cl. 91—68)

Application has been filed in Germany June 26, 1930.

The production of petrifying masses, which serve chiefly for plastering wooden walls, by the addition to pulverized asbestos, infusorial-earth, pulverized stone or other admixture substances of magnesite, magnesium chloride or Epsom salts solutions is known as the production of Sorel-cement-like masses. The objection to such masses, when plastering walls, consists chiefly in that the paster is not weather-proof so that it can only be employed for interior walls.

The object of the invention is, to produce a water and weatherproof mass, especially for plaster work, which can be employed, if desired, for building entire houses. At the same time the plaster must be fireproof, not disintegrate and withstand the different temperature conditions.

The invention consists in adding pure carbonate of lime to the magnesium oxide employed in excess with admixture substances, after which the mass is worked in known manner with mixing liquids, such as magnesium chloride, if necessary with addition of calcium chloride or magnesium sulphate or, when solid magnesium sulphate is used, with water, the hardened mass being subsequently provided with a coating of fluorides, so that a petrified mass is produced which is proof against water and weather and does not volumetrically change. The operation according to the method is for example as follows:

Pulverized asbestos, pumice stone powder, infusorial earth, pulverized stone, sawdust, cork-dust, kieselguhr and the like, one or other of the above mentioned substances may be omitted, are mixed with magnesium oxide. Carbonate of lime is also added besides the above mentioned admixture substances. The mixing is effected with magnesium chloride or Epsom salts solution or a mixture of both or employing an addition of calcium chloride. Magnesium oxide is employed in excess to the salts in the mixing liquid, up to about 50% or more, so that it acts as an admixture substance.

By the addition of carbonate of lime and calcium chloride, lime compounds are produced in the mass. These compounds cause, when an outer layer or coating of a fluoride forming substance is applied to the petrified mass, the coating to be converted into a compound insoluble in water and consequently weatherproof. For example fluorides soluble in water and applied as a coating are converted with the lime compounds into lime fluorides, which are insoluble in water.

When employing solutions of Epsom salts, a waterproof coating is also obtained by treating first with barytes compounds and fluorides.

By the addition of carbonate of lime the fireproofness of the material is also increased. By the addition of calcium chloride on the other hand, an adaptation of the setting capability to the actually existing temperature conditions is obtained according to the quantity added. The employment of lime compounds and calcium chloride further presents the advantage that it is possible to employ mineral oil paints for painting.

By the employment of magnesium oxide in excess the advantage of protection against disintegration of the material is obtained.

This excess of magnesium oxide presents the special advantage that, if during the mixing, for example by an unskilled worker, an excess of magnesium chloride is added, this is decomposed and rendered harmless by the magnesium oxide, besides this, corrosion of materials is also prevented.

The following are two examples of the method.

1. 1 part by weight of magnesium oxide is mixed with 1 to 2 parts of admixture substances, consisting of saw-dust, pumicestone powder, infusorial earths, asbestos power, talc, pulverized stone and the like, and about 10% of carbonate of lime is added thereto. This mass is then dressed with a solution of magnesium chloride, Epsom salts, or of both, or with the employment of calcium chloride in varying quantities. The solution may for example consist of one half of magnesium chloride and of one half of Epsom salts, to which, when employing magnesium chloride, 10% and more of calcium chloride solution is added. The mass is now poured in the usual way and allowed to harden. It may then be treated externally with a fluorine compound suitable to form insoluble calcium fluoride, or the mass may be first treated with a barytes compound and then with fluorine compound suitable to form barium fluoride and calcium fluoride.

2. 1 part of magnesite is mixed dry with 1 part of ground carbonate of lime, to which saw-dust or pulverized stone is preferably added. For mixing a solution of 90% magnesium chloride or Epsom salts solution or a mixture or both or in the case of magnesium chloride with the addition of 10% or less of calcium chloride is employed. The treatment is now continued as in the first example.

I claim:—

1. The process of preparing a waterproofed

Sorel-cement mass which consists in providing a filler of inert material mixed with one of the group consisting of magnesium oxide and magnesium carbonate, mixing calcium chloride therewith, treating the mixture with a solution of magnesium chloride, forming the mass and allowing the same to harden, and treating the exterior of the hardened mass with a fluorine compound capable of forming calcium fluoride to cause formation of the latter.

2. The process of preparing a waterproofed Sorel-cement mass which consists in providing a filler of inert material mixed with one of the group consisting of magnesium oxide and magnesium carbonate, mixing calcium chloride therewith, treating the mixture with a solution of magnesium chloride, forming the mass and allowing the same to harden, treating the exterior of the hardened mass with a barium compound, and then treating the exterior with a fluorine compound capable of forming fluorides with calcium and barium to form a coating of barium fluoride and calcium fluoride.

3. The process of preparing a waterproofed Sorel-cement mass which consists in providing a filler of inert material mixed with one of the group consisting of magnesium oxide and magnesium carbonate, mixing calcium chloride therewith, treating the mixture with a solution of magnesium chloride and magnesium sulphate, forming the mass and allowing the same to harden, and treating the exterior of the hardened mass with a fluorine compound capable of forming calcium fluoride to cause formation of the latter.

4. The process of preparing a waterproofed Sorel-cement which consists in providing a filler of inert material mixed with one of the group consisting of magnesium oxide and magnesium carbonate, mixing calcium chloride therewith, treating the mixture with a solution of magnesium chloride and magnesium sulphate, forming the mass and allowing the same to harden, treating the exterior of the hardened mass with a barium compound, and then treating the exterior with a fluorine compound capable of forming fluorides with calcium and barium to form a coating of barium fluoride and calcium fluoride.

HANS RUDOLPH SCHMEDES
DE LA ROCHE.